United States Patent
Huang et al.

(10) Patent No.: US 7,919,724 B2
(45) Date of Patent: Apr. 5, 2011

(54) CUTTING DEVICE FOR CUTTING HARD-BRITTLE MATERIAL

(75) Inventors: Kuo-Cheng Huang, Hsinchu (TW); Chien-Yao Huang, Hsingchu (TW); Shih-Feng Tseng, Jhubei (TW); Wen-Hong Wu, Kaohsiung (TW)

(73) Assignee: National Applied Research Laboratories, Taipei (TW)

( * ) Notice: Subject to any disclaimer, the term of this patent is extended or adjusted under 35 U.S.C. 154(b) by 859 days.

(21) Appl. No.: 11/862,497

(22) Filed: Sep. 27, 2007

(65) Prior Publication Data
US 2009/0032505 A1    Feb. 5, 2009

(30) Foreign Application Priority Data
Jul. 31, 2007   (TW) .............................. 96128090 A

(51) Int. Cl.
*B23K 26/14*    (2006.01)
*B23K 26/00*    (2006.01)

(52) U.S. Cl. .............................. 219/121.67; 219/121.84
(58) Field of Classification Search ... 219/121.6–121.86
See application file for complete search history.

(56) References Cited

U.S. PATENT DOCUMENTS

| 4,324,972 A * | 4/1982 | Furrer et al. ............. 219/121.84 |
| 6,541,730 B2 | 4/2003 | Nam et al. |
| 6,791,061 B2 * | 9/2004 | Fujii et al. ............... 219/121.75 |
| 2007/0084839 A1 * | 4/2007 | Zhang et al. ............ 219/121.84 |

FOREIGN PATENT DOCUMENTS

| DE | 198 30 237 A1 | 1/2000 |
| TW | I251519 | 3/2006 |

* cited by examiner

*Primary Examiner* — Sang Y Paik
(74) *Attorney, Agent, or Firm* — Volpe and Koenig, P.C.

(57) ABSTRACT

A cutting device for cutting a hard-brittle material along a cutting path is provided. The cutting device includes a cooling source having a first output terminal for providing a first cooling effect along the cutting path, and a heating source having a second output terminal disposed in the first output terminal for providing a heating effect following the first cooling effect along the cutting path.

19 Claims, 4 Drawing Sheets

CUTTING DEVICE FOR CUTTING HARD-BRITTLE MATERIAL

FIELD OF THE INVENTION

The present invention is related to a cutting device for cutting a hard-brittle material, and more particularly to a cutting device providing a cooling effect and a heating effect for cutting a hard-brittle material.

BACKGROUND OF THE INVENTION

With the great development of the cell phone and the liquid crystal TV industry recently, and for responding to the increasing requirement of the liquid crystal glass substrate and the requirement of low-thermal stress processing of LCD glass substrates, the thermal rupture laser cutting method has gradually taken the place of conventional cutting methods such as abrasive cut-off diamond blades and laser melting methods, and has become the main stream of LCD glass substrates processing in the second generation of optoelectronics industry. The thermal rupture laser cutting method is distinct from the conventional laser melting method in applying the principle of thermal rupture, so that the laser heat is uniform and the thermal affecting area is small. Therefore, besides the fast processing speed, the thermal rupture laser cutting method has advantages of smooth cut face and low thermal residual stress, which cannot be achieved by abrasive cut-off diamond blades and laser melting methods.

There are two kinds of laser light sources for thermal rupture cutting in the current industry, i.e. $CO_2$ gas laser ($\lambda=10.6$ μm) and YAG solid laser ($\lambda=1.064$ μm). A thermal field is provided on a glass substrate via a steady laser light being focused by a photo-lens, and a cooling effect is added for generating an initial crack on the edge of the substrate. The thermal and cooling fields provide a stress intensity factor field, which is large enough to make the initial crack grow at an equal rate and the cutting effect is finally formed. However, the conventionally provided sequence of the thermal rupture stress required by the initial crack on the edge of the substrate has difficulty in providing an initial crack successfully at a start hole of the cutting path on the substrate for getting a substrate with a random hollow shape.

In order to overcome the mentioned drawbacks in the prior art, a cutting device for cutting a hard-brittle material is provided in the present invention.

SUMMARY OF THE INVENTION

In accordance with one aspect of the present invention, a cutting device for cutting a hard-brittle material along a cutting path is provided. The cutting device comprises a cooling source having a first output terminal and providing a first cooling effect along the cutting path, and a heating source having a second output terminal disposed in the first output terminal, and providing a heating effect following the first cooling effect along the cutting path.

Preferably, the cooling source further provides a second cooling effect following the heating effect along the cutting path.

Preferably, the cooling source comprises a first input terminal transferring a cooling material to the first output terminal, the first and the second output terminals respectively has a first and a second surfaces for transferring the cooling material, the heating effect is generated by a laser beam before the laser beam is focused by a convex, and the laser beam passing through the convex enters a second input terminal of the heating source and exits at the second output terminal.

Preferably, the heating source provides the heating effect in an incident direction along the cutting path, wherein a first and a second projective vectors of the incident direction on the first and the second surfaces respectively point towards the incident direction, and a first angle between the first projective vector and the incident direction is bigger than a second angle between the second projective vector and the incident direction.

Preferably, the heating source further comprises a screw disposed between the second input terminal and the second output terminal for maintaining the cooling material surrounding the laser beam along the cutting path.

Preferably, the cutting device further comprises an elastic element connected between the cooling source and the second input terminal for adjusting a relative position between the first and the second output terminals along the incident direction for adjusting a relative intensity between the first cooling effect and the heating effect.

In accordance with another aspect of the present invention, a cutting device for cutting a hard-brittle material along a cutting path is provided. The cutting device comprises a cooling source providing a cooling effect along the cutting path, and a heating source providing a heating effect following the cooling effect along the cutting path.

Preferably, the cutting path starts at a hole on the hard-brittle material.

Preferably, the cutting path comprises a closed path on the hard-brittle material.

Preferably, the cooling effect generates a tensile stress on the hard-brittle material along the cutting path.

Preferably, the heating effect generates a compressive stress on the hard-brittle material along the cutting path.

In accordance with a further aspect of the present invention, a cutting device for cutting a hard-brittle material along a cutting path is provided. The cutting device comprises a cooling source providing a cooling zone along the cutting path, and a heating source providing a heating zone along the cutting path, wherein the cooling zone surrounds the heating zone for cutting the hard-brittle material.

Preferably, the hard-brittle material is a glass.

Preferably, the cutting path comprises a closed path on the hard-brittle material.

Preferably, the heating source provides the heating zone via a laser beam before being focused by a convex.

Preferably, the cooling source is used for providing one selected from a group consisting of water, air and nitrogen.

The present invention may best be understood through the following descriptions with reference to the accompanying drawings, wherein:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
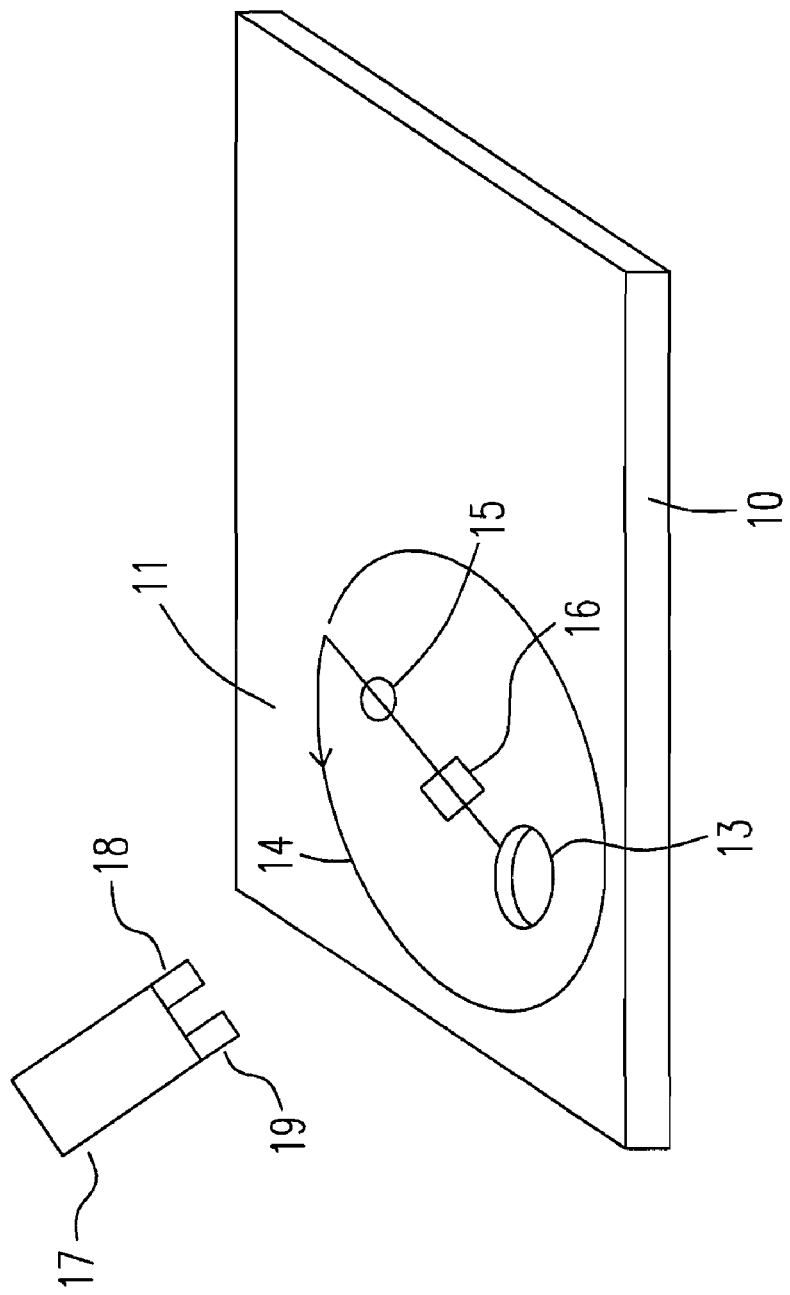
FIG. 1 is a diagram showing a cutting device for cutting a hard-brittle material according to an embodiment of the present invention.

Please refer to FIG. 1, showing a cutting device for cutting a hard-brittle material according to an embodiment of the present invention. A cutting device 17 is used for cutting a hard-brittle material 10 along a cutting path 11, wherein the cutting path 11 starts at a hole 13 and comprises a closed path 14. The cutting device 17 comprises a cooling source 18 and a heating source 19, wherein the cooling source 18 provides a cooling effect 15 along the cutting path 11 for generating a tensile stress on the hard-brittle material 10, and the heating source 19 provides a heating effect 16 following the cooling effect 15 along the cutting path 11 for generating a compressive stress on the hard-brittle material 10.

Through the mentioned tensile stress and compressive stress, an initial crack is generated at the hole 13, so that a hollow shape corresponding to the closed path 14 is generated on the hard-brittle material 10.

Figure 2:
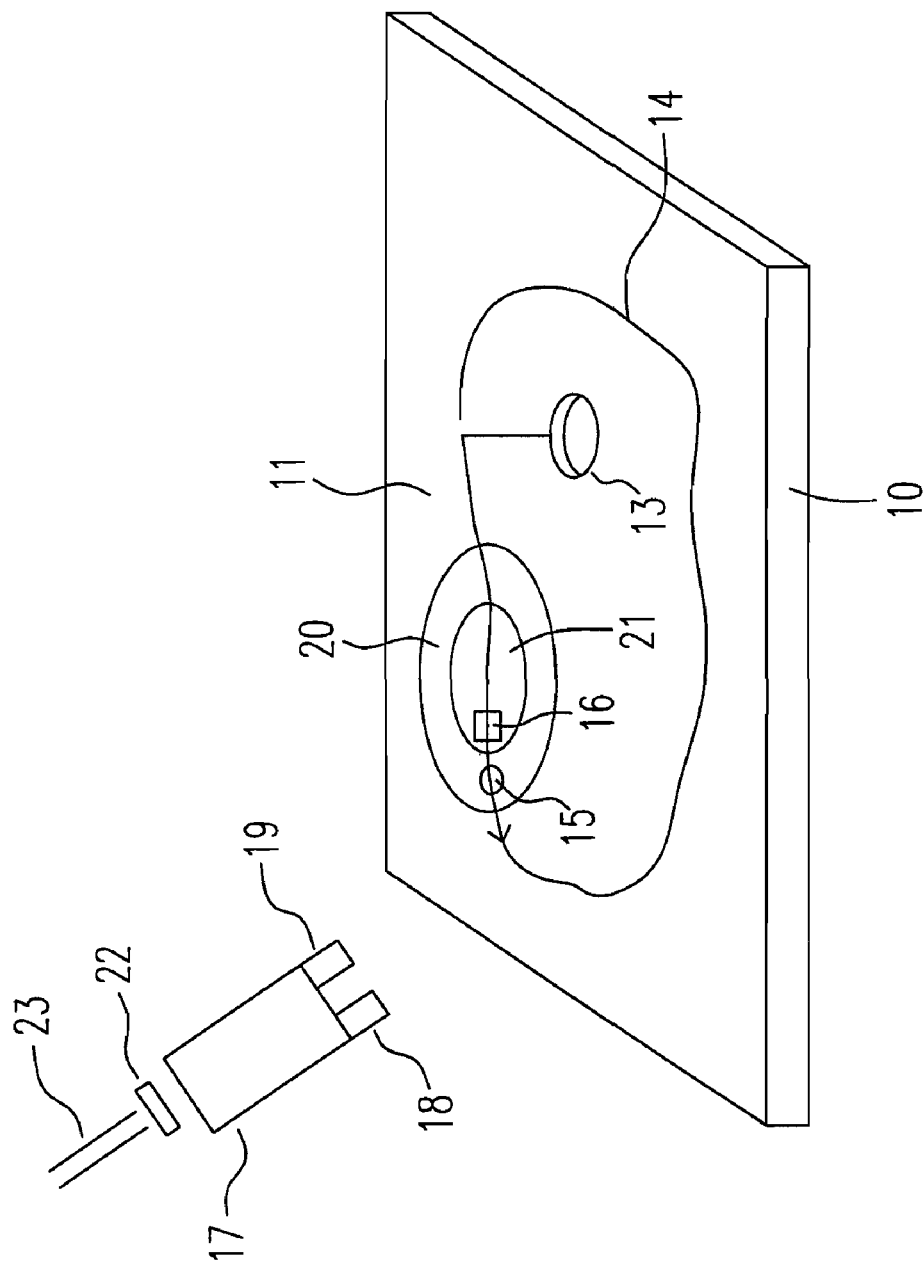
FIG. 2 is a diagram showing a cutting device for cutting a hard-brittle material according to another embodiment of the present invention.

Please refer to FIG. 2, showing a cutting device for cutting a hard-brittle material according to another embodiment of the present invention. A cutting device 17 is used for cutting a hard-brittle material 10 along a cutting path 11, wherein the hard-brittle material 10 could be a glass substrate, and the cutting path 11 starts at a hole 13 and comprises a closed path 14. The cutting device 17 comprises a cooling source 18 and a heating source 19, wherein the cooling source 18 provides a cooling zone 20 having a cooling effect 15 along the cutting path 11 for generating a tensile stress on the hard-brittle material 10, and the heating source 19 provides a heating zone 21 having a heating effect 16 along the cutting path 11 for generating a compressive stress on the hard-brittle material 10. Since the cooling zone 20 surrounds the heating zone 21, the heating effect 16 follows the cooling effect 15 along the cutting path 11 for cutting the hard-brittle material 10.

Through the mentioned tensile stress and compressive stress, an initial crack is generated at the hole 13, so that a hollow shape corresponding to the closed path 14 is generated on the hard-brittle material 10. Furthermore, in order to guide a growing direction of the initial crack and simplify the enforcement of the cutting device 17, the heating source 19 provides the heating zone 21 via a laser beam 23 before being focused by a convex 22, and the cooling source 18 generates the cooling zone 20 via providing one selected from a group consisting of water, air and nitrogen.

Figure 3:
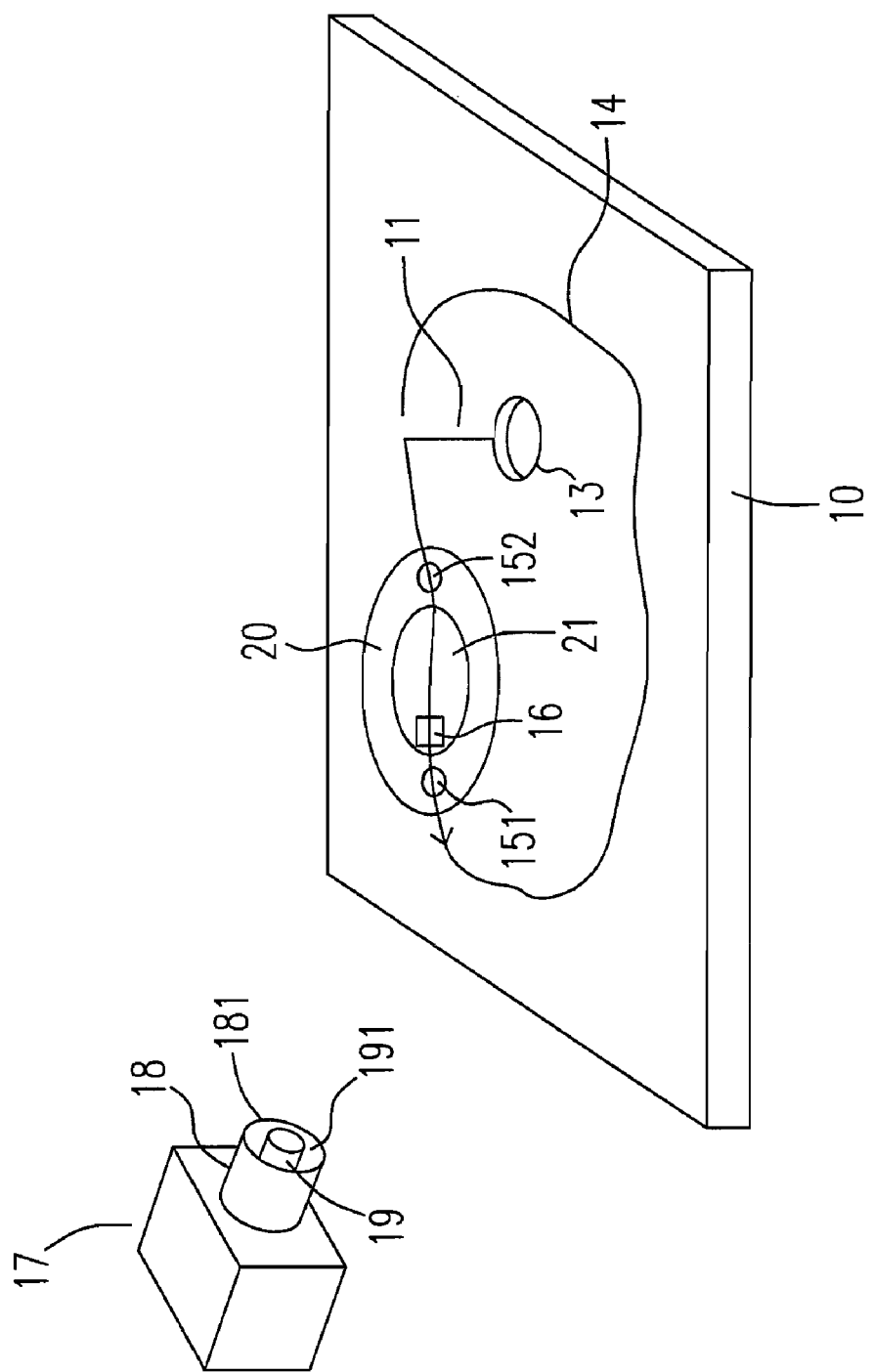
FIG. 3 is a diagram showing a cutting device for cutting a hard-brittle material according to a further embodiment of the present invention.

Please refer to FIG. 3, which is a diagram showing a cutting device for cutting a hard-brittle material according to a further embodiment of the present invention, wherein the cutting path 11 starts at a hole 13 and comprises a closed path 14. The cutting device 17 comprises a cooling source 18 and a heating source 19, wherein the cooling source 18 provides a cooling zone 20 having a first cooling effect 151 and a second cooling effect 152 along the cutting path 11 for generating a tensile stress on the hard-brittle material 10, and the heating source 19 provides a heating zone 21 having a heating effect 16 along the cutting path 11 for generating a compressive stress on the hard-brittle material 10. The cooling source 18 has a first output terminal 181, and the heating source 19 has a second output terminal 191 disposed in the first output terminal 181, so that the cooling zone 20 could surround the heating zone 21 along the cutting path 11, and therefore the heating effect 16 follows the first cooling effect 151 and the second cooling effect 152 follows the heating effect 16 along the cutting path 11 for cutting the hard-brittle material 10.

Through the mentioned tensile stress and compressive stress, an initial crack is generated at the hole 13, so that a hollow shape corresponding to the closed path 14 is generated on the hard-brittle material 10.

Figure 4:
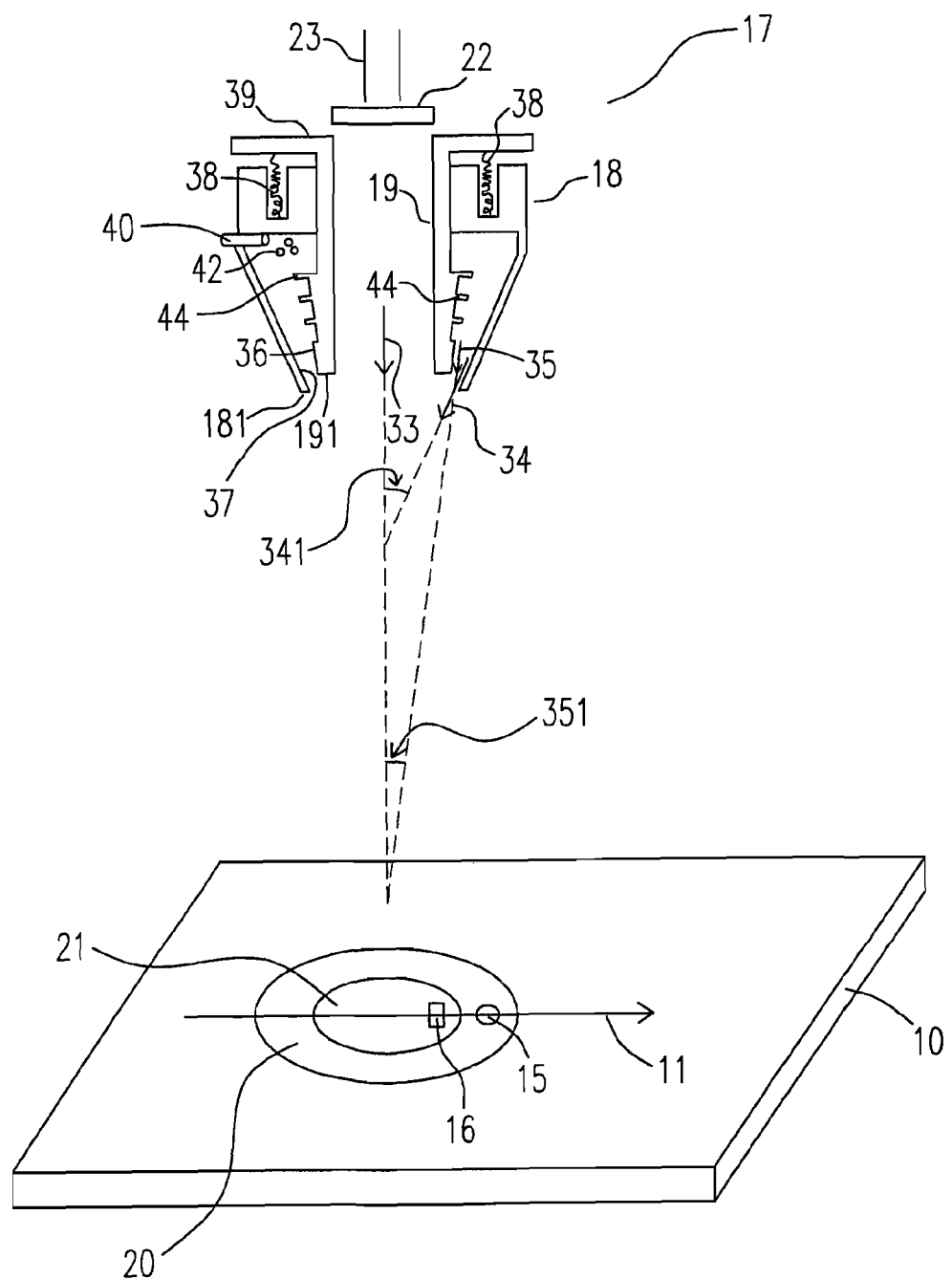
FIG. 4 is a cross-sectional view of a cutting device for cutting a hard-brittle material according to the present invention.

Please refer to FIG. 4, which is a cross-sectional view of a cutting device for cutting a hard-brittle material according to the present invention. The cutting device 17 for cutting a hard-brittle material 10 along a cutting path 11 comprises a cooling source 18 having a first input terminal 40 and a first output terminal 181, and a heating source 19 having a second input terminal 39 and a second output terminal 19. In order to simply the enforcement of the cutting device 17, the second input terminal 39 receives a laser beam 23 through a convex 22, and the laser beam 23 exits at the second output terminal 191 in an incident direction 33 for providing a heating zone 21 having a heating effect 16 on the hard-brittle material 10 along the cutting path 11. The first input terminal 40 receives a cooling material 42 selected from a group consisting of water, air and nitrogen and transfers the cooling material 42 to the first output terminal 181 for providing a cooling zone 20 having a cooling effect 15 on the hard-brittle material 10 along the cutting path 11.

In this embodiment, the first output terminal 181 has a first surface 37 and the second output terminal 191 has a second surface 36 both for transferring the cooling material 42. In order to make the first surface 37 and the second surface 36 control the flow rate of the cooling material 42 coordinately, a first projective vector 34 of the incident direction 33 on the first surface 37 and a second projective vector 35 of the incident direction 33 on the second surface 36 respectively point towards the incident direction 33, and a first angle 341 between the first projective vector 34 and the incident direction 33 is bigger than a second angle 351 between the second projective vector 35 and the incident direction 33, so that the resistance to the cooling material 42 output through the first output terminal 181 could be reduced. Furthermore, the heating source 19 comprises a screw 44 disposed between the second input terminal 39 and the second output terminal 191 for guiding a flow direction of the cooling material 42, and hence maintain the cooling material 42 surrounding the laser beam 23 along the cutting path 11. Therefore, the heating effect 16 generated by the heating zone 21 can follow the cooling effect 15 generated by the cooling zone 20 along the cutting path 11. In addition, the cutting device 17 further comprises at least an elastic element 38 connected between the cooling source 18 and the second input terminal 39 for adjusting a relative position between the first output terminal 181 and the second output terminal 191 along the incident direction 33 for adjusting a relative intensity between the cooling effect 15 and the heating effect 16.

Based on the above, a cutting device for cutting a hard-brittle material is provided in the present invention. The cutting device comprises a cooling source providing a cooling source and a heating source providing a heating effect following the cooling source. Compared with the prior art, the cutting device of the present invention provides a faster and more efficient cutting process to generate a hollow shape of a hard-brittle material. Moreover, the present invention simplifies the installation and reduces the cost of the conventional cutting device, and thus has significant value to be applied to the pertinent industry.

It is to be understood that the invention need not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A cutting device for cutting a hard-brittle material along a cutting path, comprising:
    a cooling source having a first output terminal and a first input terminal, and providing a first cooling effect along the cutting path;
    a heating source having a second input terminal and a second output terminal disposed in the first output terminal, and providing a heating effect following the first cooling effect in an incident direction along the cutting path; and
    an elastic element connected between the cooling source and the second input terminal for adjusting a relative position between the first and the second output terminals along the incident direction for adjusting a relative intensity between the first cooling effect and the heating effect.

2. A cutting device according to claim 1, wherein the cooling source further provides a second cooling effect following the heating effect along the cutting path.

3. A cutting device according to claim 1, wherein the first input terminal transfers a cooling material to the first output terminal, the first and the second output terminals respectively has a first and a second surfaces for transferring the cooling material, the heating effect is generated by a laser beam before the laser beam is focused by a convex, and the laser beam passing through the convex enters the second input terminal and exits at the second output terminal.

4. A cutting device according to claim 3, wherein a first and a second projective vectors of the incident direction on the first and the second surfaces respectively point towards the incident direction, and a first angle between the first projective vector and the incident direction is bigger than a second angle between the second projective vector and the incident direction.

5. A cutting device according to claim 3, wherein the heating source further comprises a screw disposed between the second input terminal and the second output terminal for maintaining the cooling material surrounding the laser beam along the cutting path.

6. A cutting device according to claim 1, wherein the cutting path starts at a hole on the hard-brittle material.

7. A cutting device according to claim 1, wherein the cutting path comprises a closed path on the hard-brittle material.

8. A cutting device according to claim 1, wherein the first cooling effect generates a tensile stress on the hard-brittle material along the cutting path.

9. A cutting device according to claim 1, wherein the heating effect generates a compressive stress on the hard-brittle material along the cutting path.

10. A cutting device for cutting a hard-brittle material along a cutting path, comprising:
    a cooling source having a first output terminal and providing a cooling effect along the cutting path;
    a heating source having a second output terminal and an input terminal, and providing a heating effect following the cooling effect in an incident direction along the cutting path; and
    an elastic element connected between the cooling source and the input terminal for adjusting a relative position between the first and the second output terminals along the incident direction for adjusting a relative intensity between the cooling effect and the heating effect.

11. A cutting device according to claim 10, wherein the cutting path starts at a hole on the hard-brittle material.

12. A cutting device according to claim 10, wherein the cutting path comprises a closed path on the hard-brittle material.

13. A cutting device according to claim 10, wherein the cooling effect generates a tensile stress on the hard-brittle material along the cutting path.

14. A cutting device according to claim 10, wherein the heating effect generates a compressive stress on the hard-brittle material along the cutting path.

15. A cutting device for cutting a hard-brittle material along a cutting path, comprising:
    a cooling source having a first output terminal and providing a cooling zone along the cutting path;
    a heating source having a second output terminal and an input terminal, and providing a heating zone in an incident direction along the cutting path, wherein the cooling zone surrounds the heating zone for cutting the hard-brittle material; and
    an elastic element connected between the cooling source and the input terminal for adjusting a relative position between the first and the second output terminals along the incident direction for adjusting a relative intensity between the cooling zone and the heating zone.

16. A cutting device according to claim 15, wherein the hard-brittle material is a glass.

17. A cutting device according to claim 15, wherein the cutting path comprises a closed path on the hard-brittle material.

18. A cutting device according to claim 15, wherein the heating source provides the heating zone via a laser beam before being focused by a convex.

19. A cutting device according to claim 15, wherein the cooling source is used for providing one selected from a group consisting of water, air and nitrogen.

* * * * *